United States Patent
He et al.

(10) Patent No.: US 12,351,520 B2
(45) Date of Patent: Jul. 8, 2025

(54) HIGH-ENTROPY OXIDES FOR THERMAL BARRIER COATING (TBC) TOP COATS

(71) Applicant: OERLIKON METCO (US) INC., Westbury, NY (US)

(72) Inventors: Jianhong He, Bethpage, NY (US); Heidi Lynette Lovelock, Rhoenblick (DE); Naixie Zhou, Westbury, NY (US); Tyler Harrington, New York, NY (US); Timothy Sharobem, Brooklyn, NY (US)

(73) Assignee: OERLIKON METCO (US) INC., Westbury, NY (US)

( * ) Notice: Subject to any disclaimer, the term of this patent is extended or adjusted under 35 U.S.C. 154(b) by 1019 days.

(21) Appl. No.: 17/278,590

(22) PCT Filed: Oct. 9, 2019

(86) PCT No.: PCT/US2019/055423
§ 371 (c)(1),
(2) Date: Mar. 22, 2021

(87) PCT Pub. No.: WO2020/142125
PCT Pub. Date: Jul. 9, 2020

(65) Prior Publication Data
US 2021/0347699 A1 Nov. 11, 2021

Related U.S. Application Data

(60) Provisional application No. 62/743,392, filed on Oct. 9, 2018.

(51) Int. Cl.
*C04B 35/50* (2006.01)
*C04B 35/622* (2006.01)
(Continued)

(52) U.S. Cl.
CPC ........ *C04B 35/50* (2013.01); *C04B 35/62222* (2013.01); *C04B 35/62695* (2013.01);
(Continued)

(58) Field of Classification Search
None
See application file for complete search history.

(56) References Cited

U.S. PATENT DOCUMENTS 6,812,176 B1   11/2004  Zhu et al.
6,869,550 B2   3/2005   Dorfman et al.
(Continued)

FOREIGN PATENT DOCUMENTS

CN   101081735   12/2007
CN   102245810   11/2011
(Continued)

OTHER PUBLICATIONS

Phase Composition, Thermal Conductivity, and Toughness of TiO2-Doped, Er2O3-Stabilized ZrO2 for Thermal Barrier Coating—Qi Wang, Lei Guo, Zheng Yan and Fuxing Ye; Advanced Ceramic Coatings and Interfaces; https://doi.org/10.3390/coatings8070253; Published: Jul. 20, 2018 (Year: 2018).*
(Continued)

*Primary Examiner* — Humera N. Sheikh
*Assistant Examiner* — Elizabeth D Ivey
(74) *Attorney, Agent, or Firm* — GREENBLUM & BERNSTEIN, P.L.C.

(57) ABSTRACT

A thermal barrier coating (TBC) top coat which is a high entropy oxide (HEO) having a high configurational entropy, contains at least 5 different oxide-forming metallic cations, is a single phase or single crystalline structure, such as tetragonal or cubic over unexpectedly wide temperature ranges up to and beyond top coat operating temperatures of preferably at least 2300° F. The TBC top coats exhibit low
(Continued)

thermal conductivity, good sintering resistance, excellent phase stability and good thermal cycling performance. At least five of the different oxide-forming metallic cations include: a) at least one of the transition metals: Sc, Y, Ti, Zr, V, Nb, Ta, Cr, Mo, W, Mn, Re, Fe, Ru, Co, Ni, Cu, or Zn, and/or at least one of the lanthanides La, Ce, Pr, Nd, Pm, Sm, Eu, Gd, Tb, Dy, Ho, Er, Yb, or Lu. One of the at least five different oxide-forming metallic cations may also comprise at least one of the alkaline-earth metals: Be, Mg, Ca, Sr, or Ba.

35 Claims, 8 Drawing Sheets

(51) Int. Cl.
  *C04B 35/626* (2006.01)
  *C04B 35/64* (2006.01)
(52) U.S. Cl.
  CPC ...... *C04B 35/64* (2013.01); *C04B 2235/3208* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3244* (2013.01); *C04B 2235/9669* (2013.01)

(56) References Cited

U.S. PATENT DOCUMENTS

| | | | |
|---|---|---|---|
| 7,001,859 | B2 | 2/2006 | Zhu et al. |
| 7,186,466 | B2 | 3/2007 | Zhu et al. |
| 7,655,326 | B2 | 2/2010 | Torigoe et al. |
| 7,737,063 | B2 | 6/2010 | Rosenflanz |
| 7,799,716 | B2 | 9/2010 | Mueller et al. |
| 8,486,520 | B2 | 7/2013 | Lima et al. |
| 9,975,812 | B2 | 5/2018 | Doesburg et al. |
| 2003/0126803 | A1 | 7/2003 | Rosenflanz |
| 2004/0126599 | A1 | 7/2004 | Wigren et al. |
| 2004/0197580 | A1* | 10/2004 | Dorfman ............ C04B 35/6365 428/472 |
| 2005/0244663 | A1* | 11/2005 | Ulion ................... C23C 14/083 427/446 |
| 2015/0044486 | A1 | 2/2015 | Sharma et al. |
| 2018/0022928 | A1 | 1/2018 | Blush |
| 2018/0022929 | A1 | 1/2018 | Blush |
| 2018/0128952 | A1 | 5/2018 | Yeh |

FOREIGN PATENT DOCUMENTS

| | | |
|---|---|---|
| JP | 2005-61400 | 3/2005 |
| JP | 2008.88556 | 4/2008 |
| JP | 2010-505717 | 2/2010 |

OTHER PUBLICATIONS

China First Office Action/Search Report conducted in counterpart China Appln. No. 201980063735 (Apr. 19, 2022)(w/ translation).
Japan Office Action Report conducted in counterpart Japan Appln. No. 2021-512889 (Aug. 31, 2023)(w/ translation).

C. M. Rost et al., "Entropy-stabilized oxides", Nature Communications: Sep. 25, 2015.
C. M. Rost, "Entropically-stabilized oxides: Explorations of a novel class of multicomponent materials", Ph.D thesis, North Carolina State Univ (2016).
Moballegh et al., "Chemical homogeneity in entropy-stabilized complex metal oxides", Microsc. Microanal., 21 (2015), pp. 1349-1350.
Z. Rak et al., "Evidence for Jahn-Teller compression in the (Mg,Co,Ni,Cu,Zn)O entropy", Mater Lett: 217 (2018), pp. 300-303.
C. M. Rost et al., "Local structure of the $Mg_xNi_xCo_xCu_xZn_x(x=0.2)$ entropy-stabilized oxide: An EXAFS study", J. Am Ceramic Society, 100(2017), pp. 2732-2738.
Z. Rak et al., "Charge compensation and electrostatic transferability in three entropy-stabilized oxides: Results from density functional theory calculations", J. App. I Phys., 120 (2016), pp. 95-105.
G. Anand et al., "Phase stability and distortion in high entropy oxides", Acta Mater., 146(2018), pp. 119-125.
D. Berardan et al., "Colossal dielectric constant in high entropy oxides", Phys. Status Solidi RRL 10, 4(2016), pp. 328-333.
Sarkar et al., "Nanocrystalline multicomponent entropy stabilized transition metal oxide", J. Euro Ceram Soc, 37(2017), pp. 747-754.
D. Berardan et al., "Room temperature Lithium superionic conductivity in high entropy oxides", J. Mater. Chem. A, 24(2016), pp. 9536-9541.
D. Berardan et al., "Controlled Jahn-Teller distortion in (MgCoNiCuZn)O-based high entropy oxides", J. Alloys and Compounds, 704(2017), pp. 693-700.
Sarkar et al., "High entropy oxides for reversible energy storage", Nature Communications: Aug. 24, 2018, PP.
A. Giri et al., "On the minimum limit to thermal conductivity of multi-atom component crystalline solid solutions based on impurity mass scattering", Scripta Mater., 138(2017), pp. 134-138.
R. Djenadic et al., "Multicomponent equiatomic rare earth oxides," Mater. Res. Lett., 5(2017), pp. 102-109.
K. Chen et al., "A five-component entropy-stabilized fluorite oxide," J. Euro Ceram. Soc., 38(2018), pp. 4161-4164.
A. Sarkar et al., "Multicomponent equiatomic rare earth oxides with narrow band gap and associated praseodymium multivalency," Dalton Transactions, 36(2017), pp. 12167-176.
S. Jiang et al., "A new class of high-entropy perovskite oxides," Scripta Mater., 142(2018), pp. 116-120.
A. Sarkar et al., "Rare earth and transition metal based entropy stabilized perovskite type oxides," J. Euro. Ceram. Soc., 38(2018), pp. 2318-2327.
J. Dabrowa et al., "Synthesis and microstructure of $(Co,Cr,Fe,Mn,Ni)_3)_4$ high entropy oxide characterized by spinel structure," Mater. Lett., 216(2018), pp. 32-36.
A. Navrotsky et al., "The thermodynamics of cation distributions in simple spinels," J. Inorg. Nucl. Chem., vol. 29, No. 11, (1967), pp. 2701-2714.
Gild et al., "High-entropy flourite oxides," Journal of the European Ceramic Society, 38(2018), pp. 3578-3584.
Int'l Search Report (Form PCT/ISA/210) conducted in Int'l Appln. No. PCT/US2019/055423 (Jun. 19, 2020).
Int'l Written Opinion (Form PCT/ISA/237) conducted in Int'l Appln. No. PCT/US2019/055423 (Jun. 19, 2020).

* cited by examiner

HIGH-ENTROPY OXIDES FOR THERMAL BARRIER COATING (TBC) TOP COATS

CROSS-REFERENCE TO RELATED APPLICATIONS

The present application claims the benefit of U.S. Provisional Patent Application No. 62/743,392 filed Oct. 9, 2018, the disclosure of which is expressly incorporated by reference herein in its entirety.

TECHNICAL FIELD

The present invention relates to top coat materials for thermal barrier coatings (TBCs) with excellent phase stability and dimensional stability over a wide temperature range, and good thermal cycling performance with low heat conductivity. The top coat materials may be in the form of a powder, alloy, top coat or coating, and may be employed in a thermal spray powder with bond coating materials to obtain a thermal barrier coating (TBC) system. The present invention also relates to a method for reducing delamination of a top coat from a bond coat and substrate, such as a gas turbine engine component.

BACKGROUND OF THE INVENTION

A complete thermal barrier coating system includes a top coat, such as a thermal barrier coating (TBC), and a bond coat or bond layer. A common bond coat is made of MCrAlY alloy, where M represents Ni, Co, Fe or their combinations. To increase the performance of a bond coat, Hf, Re and Pt and various other rare earth elements are often added in advanced bond coats. A common top coat is made of zirconia ($ZrO_2$) stabilized by one or more of yttrium oxide, ytterbium oxide, cerium oxide, titanium oxide, magnesium oxide, calcium oxide, lanthanum oxide, or dysprosium oxide, or of gadolinium zirconate ($Gd_2Zr_2O_7$).

The TBC system is applied and bonded to a substrate, such as a superalloy and protects the substrate in a hot and harsh environment such as in a gas turbine engine environment. The bond coat or bond layer is between the top coat and the substrate, and bonds the top coat to the substrate. The bond coat or bond layer is formed from a bond coating material, which may be in powder form for application to the substrate. The bond coat or bond layer formed from the bond coating material affects the thermal cyclic fatigue and sulfidation resistance of the top coat, such as a TBC, which may be evaluated for effectiveness by the furnace cyclic lifetime of the TBC with and without the presence of sulfur. A TBC can be degraded due to high temperatures and a harsh environment, such as the presence of sulfur. For example, using oil containing a high sulfur content as fuel in an industrial gas turbine having a TBC is one important factor reducing TBC lifetime.

One important failure of a complete TBC system happens at the bond coat/top interface. When a TBC system is exposed to a high temperature, an oxide layer, called a thermally grown oxide (TGO), nucleates and grows between the bond coat and top coat, to block oxygen to further diffuse inward to prevent the substrate from oxidation. A dense alpha-alumina layer of TGO is desired because it effectively blocks oxygen diffusion inward and also grows slowly itself. However, there are significant differences in thermal expansion coefficients of the top coat, bond coat and TGO. Significant internal stresses caused by temperature changes are built up at the top coat/TGO interface and the TGO/bond coat interface while a TBC system experiences thermal cycles (room temperature to operation temperature to room temperature). As the TGO layer thickens, the thermal internal stresses become higher and higher, and eventually the top coat, such as the TBC, fails due to delamination by thermal internal stresses. To increase performance and energy efficiency, modern jet engines and industrial gas turbines are seeking a higher operation temperature, therefore a higher thermal shock resistance of a TBC system is desired.

It has been found that changes in crystal structure or a phase change when subjected to temperature changes from room temperature to higher operation temperatures and vice versa, for example from a tetragonal crystal structure to a cubic or fluorite crystal structure or phase or vice versa, can be accompanied by a substantial change in volume of a top coat which can cause deleterious delamination of the top coat from a bond coat or substrate.

Thermal barrier coatings (TBCs) are a critical technology for aero engines and industrial gas turbines. The baseline TBC system comprises a (Ni, Co, Fe)CrAlY bond coat with an oxide ceramic top coat. The top coat is typically a $Y_2O_3$-stabilized ZrO2 with 7-8 wt % $Y_2O_3$. Key TBC requirements are: low thermal conductivity; phase and dimensional stability across the operating temperature range; resistance to sintering at the high end of the operating temperature range; and good oxidation and thermal cycling performance of the combined coating system. For aero engines resistance to 'CMAS' attack is also important. Molten CMAS (calcia-magnesia-aluminosilica) deposits ingested with intake air penetrate and interact with thermal barrier coatings (TBCs) in gas-turbine engines to degrade the zirconia-based TBCs and the overall TBC performance. As gas turbine engines are driven to operate at higher temperatures to maximize efficiency, components become more susceptible to attack by deposits of calcium magnesium alumino-silicate (CMAS). Molten CMAS is known to interact with TBCs both thermochemically, by dissolving the ceramic and reprecipitating it as a new or modified phase, and thermomechanically, by infiltrating the porosity and degrading the strain tolerance.

Many variants of thermal barrier coating (TBC) top coat chemistry described above are in use today. This baseline TBC system is, however, now reaching its limits, particularly in terms of thermal conductivity.

High entropy oxides (HEOs) are oxides with a high configurational entropy, S(config). They typically contain five or more different metal cation types as well as oxygen, to form one or more oxide sublattices. HEOs have high levels of lattice distortion and other lattice defects. This reduces thermal conductivity and can improve mechanical properties, such as toughness. The configurational entropy $S_{config}$ of an HEO is generally 1.5R per mole or greater, where R is the gas constant 8.314 J·K$^{-1}$ mol$^{-1}$; this definition using the value of $S_{config}$ being a commonly-accepted definition of a high-entropy material.

Numerous thermal barrier coatings containing multiple metal oxides and lower heat conductivity are known, but their use as a top coat having a single phase which does not undergo a phase change over a wide temperature range is not disclosed. For example, U.S. Pat. No. 6,812,176 to Zhu et al, the disclosure of which is herein incorporated by reference in its entirety, discloses a thermal barrier coating composition which is about 46-97 molar percent base oxide, about 2-25 molar percent primary stabilizer, about 0.5-12.5 molar percent group A dopant, and about 0.5-12.5 molar percent group B dopant. The base oxide is selected from the group consisting of $ZrO_2$, $HfO_2$, and combinations thereof. The primary stabilizer dopant is selected from the group consisting of $Y_2O_3$, $Dy_2O_3$, and $Er_2O_3$ and combinations thereof. The group A dopant is selected from the group consisting of alkaline earth oxides, transition metal oxides, rare earth oxides and combinations thereof. The group B dopant is selected from the group consisting of $Nd_2O_3$, $Sm_2O_3$, $Gd_2O_3$, $Eu_2O_3$ and combinations thereof. The Zhu patent does not disclose the compositions as high entropy oxides (HEOs) or as having an $S_{config}$ greater than 1.5R.

U.S. Pat. Nos. 7,001,859 and 7,186,466 each to Zhu et al, the disclosures of which are each herein incorporated by reference in their entireties, each disclose thermal barrier coating compositions having 46-97 molar percent base oxide, 2-25 molar percent primary stabilizer, 0.5-25 molar percent group A dopant, and 0.5-25 molar percent group B dopant. The base oxide is selected from the group consisting of $ZrO_2$, $HfO_2$ and combinations thereof; the primary stabilizer is selected from the group consisting of $Y_2O_3$, $Dy_2O_3$, $Er_2O_3$ and combinations thereof; the group B dopant is selected from the group consisting of $Nd_2O_3$, $Sm_2O_3$, $Gd_2O_3$, $Eu_2O_3$ and combinations thereof; and the group A dopant is selected from the group consisting of rare earth oxides, alkaline earth metal oxides, transition metal oxides and combinations thereof, but excluding those species contained in the base oxide, group B dopant and primary stabilizer groups. The ratio of the molar percentages of group A dopant to group B dopant in the composition is between about 1:10 and about 10:1. Neither of the Zhu patents disclose their compositions as high entropy oxides (HEOs) or as having an $S_{config}$ greater than 1.5R.

The high entropy ($S_{config}$ is greater than 1.5R) can be calculated for any composition using standard thermodynamic formulae, as described in, for example C. M. Rost, Ph. D thesis, North Carolina State Univ (2016), "Entropically-stabilized oxides: Explorations of a novel class of multi-component materials," the disclosure of which is herein incorporated by reference in its entirety.

U.S. Pat. No. 7,001,859 to Dorfman et al, and U.S. Pat. No. 9,975,812 to Doesburg et al, the disclosures of which are herein incorporated by reference in their entireties, each discloses a ceramic material for use in thermal barriers for high temperature cycling applications and high temperature abradable coatings. The material is an alloy formed predominantly from ultra-pure stabilized zirconia ($ZrO_2$) and/or hafnia ($HfO_2$) alloys that have uncharacteristically high sintering resistance to achieve a high service lifetime. It is disclosed that changes in the coating microstructure over the in-service lifetime are retarded. The material has about 4 to 20 weight percent of a stabilizer of one or more rare earth oxides; and a balance of at least one of zirconia ($ZrO_2$), hafnia ($HfO_2$) and combinations thereof, wherein the zirconia ($ZrO_2$) and/or hafnia ($HfO_2$) is partially stabilized by the stabilizer, and wherein the total amount of impurities is less than or equal to 0.15 weight percent. The patents disclose that zirconia alloys have: 1) some of the highest melting points of all ceramics, and this means theoretically some of the highest temperatures for which the onset of sintering occurs, 2) one of the lowest thermal conductivities of all ceramics, and 3) one of the highest coefficients of thermal expansion of all ceramics, so it is most compatible with transition metal alloys during thermal cycling. However, according to the patents, zirconia alone cannot fulfill the coating requirements because it undergoes a phase transformation from tetragonal to monoclinic during thermal cycling. This transformation is presumed to cause a detrimental volume change resulting in large strain differences between the coating and the substrate. When the resulting stresses exceed the bond strength of the coating to the substrate, the coating will detach. For this reason a phase stabilizer is added to the zirconia and/or hafnia, such as yttria, which suppresses the tetragonal to monoclinic phase transformation. The compositions are not disclosed as high entropy oxides (HEOs) or as having an $S_{config}$ greater than 1.5R.

U.S. Patent Application Publication Nos. 2018/0022928 and 2018/0022929 each to Blush, the disclosures of which are herein incorporated by reference in their entireties, disclose coated articles supporting high-entropy nitride and/or oxide thin film inclusive coatings. The high-entropy alloys systems are heat stable and may be used in optical coatings. A first material system that may be used includes SiAlN with one or more (and preferably two or more) of elements such as Hf, Y, Zr, Ti, Ta, and Nb. A second material system that may be used includes TiO, with one or more (and preferably two or more) of elements such as Fe, Co, Ni, Sn, Zn, and N. The material systems may in some cases be high-index materials that can serve as a substitute for titanium oxide in layer stacks. It is disclosed that current high-entropy alloys are known to have high temperature stability because of extremely high entropic contributions. This is related to their equiatomic or near-equiatomic compositions, and the high number of elemental constituents. It is known that $\Delta G = \Delta H - T\Delta S$ (where $\Delta G$ is the change in Gibbs free energy, $\Delta H$ is enthalpy, T is temperature, and $\Delta S$ is entropy). The phase with the lowest Gibbs free energy of formation will be the phase formed at equilibrium, so increasing entropy will increase the likelihood of a phase being stable. According to Blush, generally, traditional low entropy materials have a $\Delta S_{config}$ of about 1 R (or sometimes lower), medium entropy materials have a $\Delta S_{config}$ of about 1 R to about 1.5 R, and high entropy materials have a $\Delta S_{config}$ of greater than about 1.5 R. However, it is disclosed, the lines between low and medium, and medium and high, need not be precisely delineated. For instance, some materials may have four constituent materials nonetheless may be considered high-entropy for these purposes, even though $\Delta S_{config}$ might ordinarily be expected to be slightly less than 1.5 R. Use of the compositions in TBC systems is not disclosed.

U.S. Patent Application Publication No. 2018/0128952 to Yeh, the disclosure of which is herein incorporated by reference in its entirety, discloses a multi-film structure coated on the surface of a workpiece, where the multi-film structure is formed, for example, by making a high-entropy material film of at least two layers and a non-high-entropy material film of at least one layer stacked on each other. The high-entropy material film may be a high-entropy alloy film, high-entropy nitride film, high-entropy carbide film, high-entropy nitroxide film, high-entropy carbonitride film, high-entropy oxide film, high-entropy carbon oxide film, and other high-entropy ceramic films. Exemplary high-entropy films disclosed are a high-entropy alloy film having the equiatomic composition of AlCrNbSiTi and a thickness of 0.25 μm, a high-entropy nitride film having the composition of (AlCrNbSiTi)N, i.e. $(Al_{10}Cr_{10}Nb_{10}Si_{10}Ti_{10})N_{50}$ and a thickness of 0.2 m, a high-entropy nitride film having the composition of (CrNbSiTiZr)N and a thickness of 0.15 m, a high-entropy alloy film having the composition of AlCrNbSiTi and a thickness of 0.8 μm, a high-entropy oxide film having the composition of $(AlCrNbSiTi)_{40}O_{60}$ and a thickness of 0.2 μm, a high-entropy alloy film having the composition of AlCrNbSiTiZr and a thickness of 0.4 μm, a high-entropy carbonitride film having the composition of (AlCrNbSiTiZr)$_{50}$C$_{20}$N$_{30}$ and a thickness of 0.4 μm, a high-entropy carbon oxynitride film having the composition of (AlCrNbSiTiZr)$_{40}$C$_{20}$N$_{30}$O$_{20}$ and a thickness of 0.6 m, a high-entropy nitride film having the composition of (AlCrNbSiTiZr)N and a thickness of 0.2 m, and a high-entropy carbide film having the composition of (CrNbSiTiZr)C and a thickness of 0.2 μm. Use of the compositions in TBC systems is not disclosed.

Metal oxides of the formula MO, where "M" represents 5 or more oxide-forming metals, which are HEOs having the rock salt "NaCl" crystal lattice structure are disclosed in the following articles, the disclosures of each of which are herein incorporated by reference in their entireties:

1. C. M. Rost, Ph. D thesis, North Carolina State Univ (2016), "Entropically-stabilized oxides: Explorations of a novel class of multicomponent materials."
2. C. M. Rost, E. Sachet, T. Borman, A. Moballegh, E. Dickey, D. Hou, J. Jones, S. Curtarolo, J. P. Maria, *Nature Communications:* 09-25-2015, "Entropy-stabilized oxides."
3. Moballegh, C. M. Rost, Jon-Paul Maria, E C. Dickey, *Microsc. Microanal.*, 21 (2015), pp. 1349-1350: "Chemical homogeneity in entropy-stabilized complex metal oxides."
4. Z. Rak, J-P, Maria, D. W. Brenner, *Mater Lett:* 217 (2018) pp. 300-303: "Evidence for Jahn-Teller compression in the (Mg,Co,Ni,Cu,Zn)O entropy."
5. C. M. Rost, Z. Rak, D. W. Brenner J.-P. Maria, *J. Am Ceramic Society*, 100(2017), pp. 2732-2738, "Local structure of the Mg$_x$Ni$_x$Co$_x$Cu$_x$Zn$_x$ (x=0.2) entropy-stabilized oxide: An EXAFS study."
6. Z. Rak, C. M. Rost, M. Lim, P. Sarker, C. Toher, S. Curtarolo, J. P. Maria, D. W. Brenner, *J. App. l Phys.*, 120 (2016) pp. 95-105, "Charge compensation and electrostatic transferability in three entropy-stabilized oxides: results from density functional theory calculations."
7. G. Anand, A. P. Wynn, C. M. Handley, C. L. Freeman, *Acta Mater.*, 146(2018) pp. 119-125, "Phase stability and distortion in high entropy oxides."
8. Sarkar, R. Djenadic, N. J. Usharani, K. P. Sanghvi, *J. Euro Ceram Soc*, 37(2017) pp. 747-754, "Nanocrystalline multicomponent entropy stabilized transition metal oxide."
9. D. Berardan, S. Franger, D. Dragoe, A. K. Meena and N. Dragoe, *Phys. Status Solidi RRL* 10, 4(2016), pp. 328-333, "Colossal dielectric constant in high entropy oxides."
10. D. Berardan, S. Franger, A. K. Meena and N. Dragoe, *J. Mater. Chem. A*, 24(2016), pp. 9536-9541, "Room temperature Lithium superionic conductivity in high entropy oxides."
11. D. Berardan, A. K. Meena, S. Franger, C. Herrero and N. Dragoe, *J. Alloys and Compounds*, 704(2017) pp. 693-700, "Controlled Jahn-Teller distortion in (MgCoNiCuZn)O-based high entropy oxides."
12. Sarkar, L. Velasco, D. Wang, Q. Wang, G. Talasila, L. de Biasi, C. Kubel, T. Brezesinski, S. Bhattacharya, H. Hahn, B. Breitung, *Nature Communications:* 08-24-2018, "High entropy oxides for reversible energy storage."
13. A. Giri, J. Braun, C. M. Rost, P. E Hopkins, *Scripta Mater.*, 138(2017) 134-138, "On the minimum limit to thermal conductivity of multi-atom component crystalline solid solutions based on impurity mass scattering."

Use of the compositions in TBC systems is not disclosed in the articles.

Metal oxides of the formula MO$_2$, where "M" represents 5 or more oxide-forming metals, which are HEOs having the fluorite "CaF$_2$" crystal lattice structure are disclosed in the following articles, the disclosures of each of which are herein incorporated herein by reference in their entireties:

14. R. Djenadic, A. Sarkar, O. Clemens, C. Loho, M. Botros, V. Chakravadhanula, C. Kubel, S. Bhattacharya, A. Gandhi, H. Hahn, *Mater. Res. Lett.* 5(2017), pp. 102-109, "Multicomponent equiatomic rare earth oxides."
15. K. Chen, X. Pei, L. Tang, H. Cheng, Z. Li, C. Li, X. Zhang, L. An, *J. Euro Ceram Soc*, 38(2018) pp. 4161-64, "A five-component entropy-stabilized fluorite oxide."
16. A. Sarkar, C. Loho, L., Velasco, T. Thomas; S. Bhattacharya, H. Hahn, R. Djenadic, *Dalton Transactions* 36(2017), pp. 12167-176, "Multicomponent equiatomic rare earth oxides."

Use of the compositions in TBC systems is not disclosed in the articles.

ABO$_3$ type oxides where A and B are cations, which are HEOs having the perovskite crystal lattice structure are disclosed in the following articles, the disclosures of each of which are incorporated herein by reference in their entireties:

17. S. Jiang, T. Hu, J. Gild, N. Zhou, J. Nie, M. Qin, T. Harrington, K. Vecchio, J. Luo, *Scripta Mater,* 142(2018), pp. 116-120, "A new class of high-entropy perovskite oxides." 18. A. Sarkar, R. Djenadic, D. Wang, C. Hein, R. Kautenburger, O. Clemens, H. Hahn, *J Euro Ceram Soc*, 38(2018) pp. 2318-2327, "Rare earth and transition metal based entropy stabilized perovskite type oxides."

Use of the compositions in TBC systems is not disclosed in the articles.

Metal oxides of the formula M$_3$O$_4$, where "M" represents 5 or more oxide-forming metals, which are HEOs having the spinel crystal lattice structure are disclosed in the following articles, the disclosures of each of which are incorporated herein by reference in their entireties:

19. J. Dabrowa, M. Stygar, A. Mikula, A. Knapik, K. Mroczka, W. Tejchman, M. Danielewski and M. Martin, *Mater. Lett,* 216(2018) pp. 32-36, "Synthesis and microstructure of (Co,Cr,Fe,Mn,Ni)$_3$O$_4$ high entropy oxide characterized by spinel structure."
20. A. Navrotsky and O. J. Klepp. a, *J. Inorg. Nucl. Chem.*, vol 29, no. 11, pp. 2701-2714, 1967, "The thermodynamics of cation distributions in simple spinels."

Use of the compositions in TBC systems is not disclosed in the articles.

While high-entropy oxides are known, their use as a top coat in a TBC was not known. For example, co-inventor Naixie Zhou's is a co-author of the above-listed article 17 which states that "This study represents the first report of successful synthesis of high-entropy perovskite oxides (i.e. single solid-solution phases of multi-cation perovskite oxides with high configuration entropies of >1.5R per mole."

Gild et al, "High-entropy fluorite oxides," Journal of the European Ceramic Society, 38 (2018), 3578-3584, the disclosure of which is herein incorporated by reference in its entirety, is co-authored by co-inventor Tyler Harrington, and discloses eleven fluorite oxides with five principal cations (in addition to a four-principal-cation (Hf$_{0.25}$Zr$_{0.25}$Ce$_{0.25}$Y$_{0.25}$)O$_{2-\delta}$ as a start point and baseline) fabricated via high-energy ball milling, spark plasma sintering, and annealing in air. Eight of the compositions, namely (Hf$_{0.25}$Zr$_{0.25}$Ce$_{0.25}$Y$_{0.25}$)O$_{2-\delta}$, (Hf$_{0.25}$Zr$_{0.25}$Ce$_{0.25}$)(Y$_{0.125}$Yb$_{0.125}$)O$_{2-\delta}$, (Hf$_{0.2}$Zr$_{0.2}$Ce$_{0.2}$)(Y$_{0.2}$Yb$_{0.2}$)O$_{2-\delta}$, (Hf$_{0.25}$Zr$_{0.25}$Ce$_{0.25}$)(Y$_{0.125}$Ca$_{0.125}$)O$_{2-\delta}$, (Hf$_{0.25}$Zr$_{0.25}$Ce$_{0.25}$)(Y$_{0.125}$Gd$_{0.125}$)O$_{2-\delta}$, (Hf$_{0.2}$Zr$_{0.2}$Ce$_{0.2}$)(Y$_{0.2}$Gd$_{0.2}$)O$_{2-\delta}$, (Hf$_{0.25}$Zr$_{0.25}$Ce$_{0.25}$)(Yb$_{0.125}$Gd$_{0.125}$)O$_{2-\delta}$, and (Hf$_{0.2}$Zr$_{0.2}$Ce$_{0.2}$)(Yb$_{0.2}$ Gd$_{0.2}$)O$_{2-\delta}$, possess single-phase solid solutions of the fluorite crystal structure with high configurational entropies (on the cation sublattices), akin to those high-entropy alloys and ceramics reported in prior studies. Most high-entropy fluorite oxides (HEFOs), it is disclosed, except for the two containing both Yb and Gd, can be sintered to high relative densities. According to Gild et al, these single-phase HEFOs exhibit lower electrical conductivities and comparable hardness (even with higher contents of softer components such as $Y_2O_3$ and $Yb_2O_3$), in comparison with 8 mol. % $Y_2O_3$-stabilized $ZrO_2$ (8YSZ). Notably, it is disclosed, these single-phase HEFOs possess lower thermal conductivities than that of 8YSZ, presumably due to high phonon scattering by multiple cations and strained lattices. The high-entropy fluorite oxides (HEFOs) consist of solid solutions with equal molar fractions of $HfO_2$, $ZrO_2$, and $CeO_2$ as the base materials, as well as the additions of the oxides of Y, Yb, Ca, Ti, La, Mg, and Gd as fluorite phase stabilizers. The thermal conductivities of YSZ, it is disclosed, have been extensively studied due to its use as a thermal barrier coating at high temperatures. The conductivity is observed to be dependent upon the porosity, fabrication method, and doping level. The measured thermal conductivities of eight of the single-phase HEFOs reported as all being lower than that of 8YSZ. However, hafnium is a very heavy metal, and the high content of hafnium in these high-entropy fluorite oxides increases the weight and density of the coating which is less desirable in aerospace applications.

The present invention provides TBC top coats with lower thermal conductivity than currently used TBC top coats, and good sintering resistance, excellent phase stability and good thermal cycling performance. The top coats are high entropy oxides which exhibit a single phase or single crystalline structure, such as tetragonal or cubic over a prolonged temperature range which may be from room temperature to the operating temperature of top coats for turbine blades in jet engines. The high entropy oxide top coats of the present invention which exhibit a single phase or maintain a phase composition without transformation throughout the heat cycling do not delaminate from a thermal bond coating or substrate at high operating temperatures due to substantial volume changes caused by a change in crystal structure or phase change. A high content of hafnium can be included, but is not required thereby lowering coating weight and density, while providing low heat conductivity and maintaining single phase crystalline structures such as cubic or tetragonal, over prolonged periods of time for unexpectedly wide temperature ranges up to and beyond top coat operating temperatures.

SUMMARY OF THE INVENTION

In accordance with the present invention, a thermal barrier coating (TBC) with low thermal conductivity which exhibits a single phase or single crystalline structure, such as tetragonal or cubic over a prolonged temperature range comprises a top coat which is a high entropy oxide (HEO) having a high configurational entropy. In aspects of the present invention, the phase composition is largely retained without transformation from room temperature to the operating temperature of top coats for gas turbine components. The HEO is of the form $M_xO_y$, where M represents a group of at least 5 different oxide-forming metallic cations, x represents the number of metal cations (M) or atoms, and y represents the number of oxygen anions (0) or atoms. In embodiments of the invention, at least five of the different oxide-forming metallic cations (M) may comprise: a) at least one, preferably at least two of the transition metals Sc, Y, Ti, Zr, V, Nb, Ta, Cr, Mo, W, Mn, Re, Fe, Ru, Co, Ni, Cu, or Zn, and/or b) at least one, preferably at least two, of the lanthanides La, Ce, Pr, Nd, Pm, Sm, Eu, Gd, Tb, Dy, Ho, Er, Yb, or Lu. In some embodiments at least one of the oxide-forming metallic cations comprises an alkaline-earth metal: Be, Mg, Ca, Sr, or Ba.

In embodiments of the invention the thermal barrier coating may comprise at least five different metal oxides which are:

a) $Y_2O_3$ in an amount of from 5% by weight to 18% by weight, b) $ZrO_2$ in an amount of from 12% by weight to 55% by weight, c) CaO in an amount of from 0% by weight to 15% by weight, d) $Gd_2O_3$ in an amount of from 0% by weight to 30% by weight, e) $La_2O_3$ in an amount of from 0% by weight to 26% by weight, f) $Yb_2O_3$ in an amount of from 0% by weight to 32% by weight, g) $TiO_2$ in an amount of from 0% by weight to 10% by weight, or h) $CeO_2$ in an amount of from 0% by weight to 18% by weight, the percentages of a) to h) adding up to at least 97% by weight and preferably between 98% and 100% by weight.

In aspects of the invention, the thermal barrier coating material used to form the top coat may be in powder form, or wire, ingot, bar or rod form. In each instance, the chemical composition of the thermal barrier coating material or top coat material may be as described for the thermal barrier coating (TBC) or top coat.

In another aspect of the invention, a thermal barrier coating (TBC) system includes a top coat and a bond coat or bond coating, with the top coat being bonded to the bond coat or bond coating. A coated substrate comprises a substrate and the thermal barrier coating system bonded to the substrate by the bond coat or coating. The thermal barrier coating system may be produced from the thermal spray powder. The thermal barrier coating system is bonded to a substrate, such as a superalloy, by the bond coat or bond coating, which is between the top coat and the substrate.

In an additional aspect of the invention, delamination of a top coat from a substrate is reduced by bonding the top coat to the substrate with the bond coat or coating. The top coat may comprise a thermal barrier coating (TBC), and the substrate may comprise a gas turbine engine component.

BRIEF DESCRIPTION OF THE DRAWINGS

The present invention is further illustrated by the accompanying drawings wherein.

DETAILED DESCRIPTION OF THE INVENTION

Figure 1:
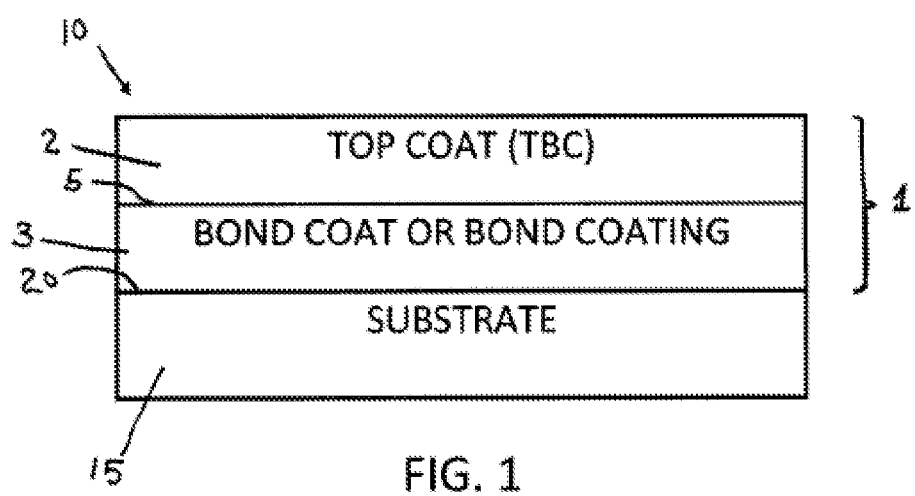
FIG. 1 schematically illustrates a coated substrate having a thermal barrier coating (TBC) system which includes a top coat, such as a thermal barrier coating (TBC) bonded to the bond coat or coating in accordance with the present invention.
Figure 2:
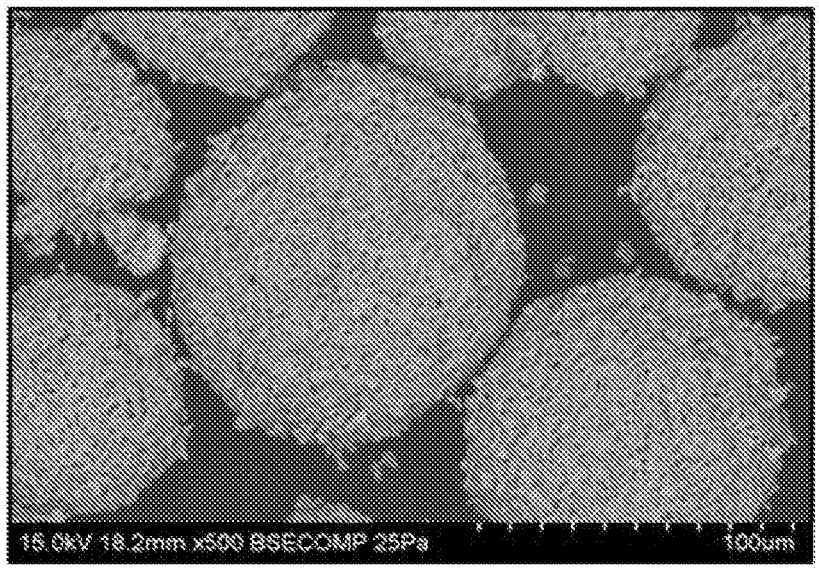
FIG. 2 shows the morphology (SEM micrograph) for the HEO agglomerated and sintered powder of Sample HEO 1.
Figure 3:
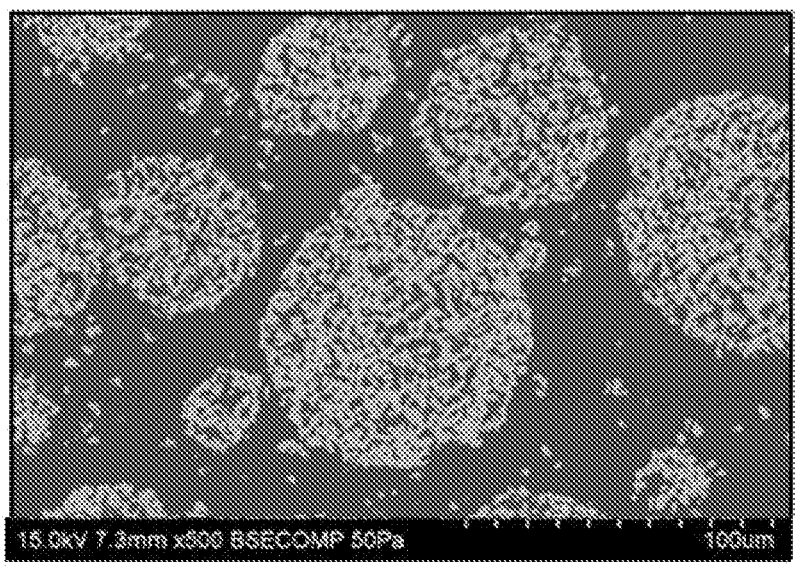
FIG. 3 shows the cross section (SEM micrograph) for the HEO agglomerated and sintered powder of Sample HEO 1.
Figure 4:
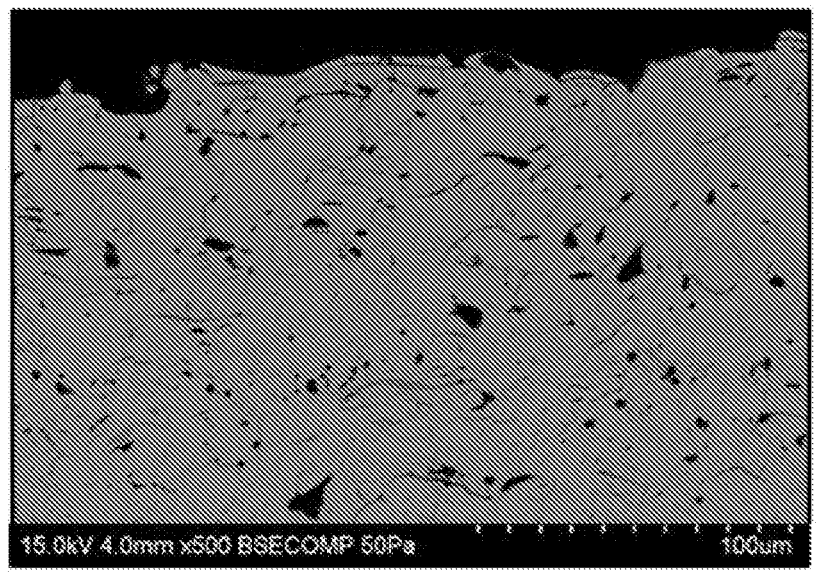
FIG. 4 shows the cross section microstructure (SEM micrograph) for the HEO thermal barrier coating, TBC top coat, of Sample HEO 1.
Figure 5:
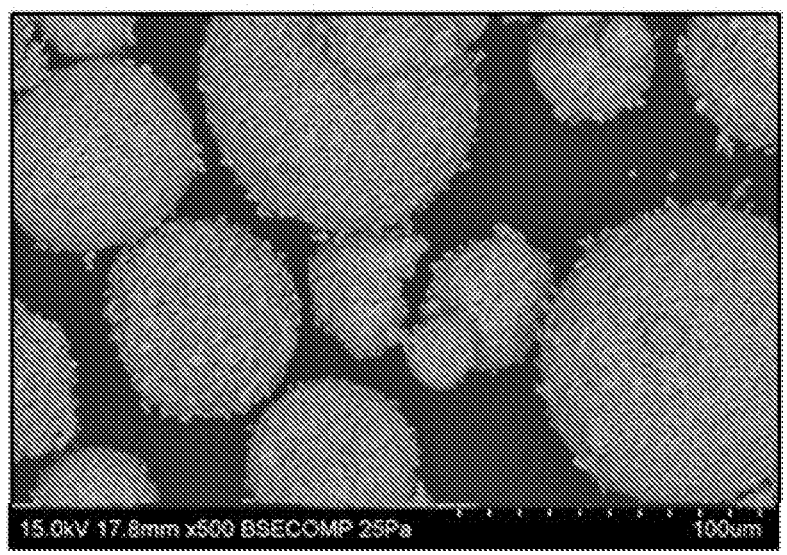
FIG. 5 shows the morphology (SEM micrograph) for the HEO agglomerated and sintered powder of Sample HEO 2.
Figure 6:
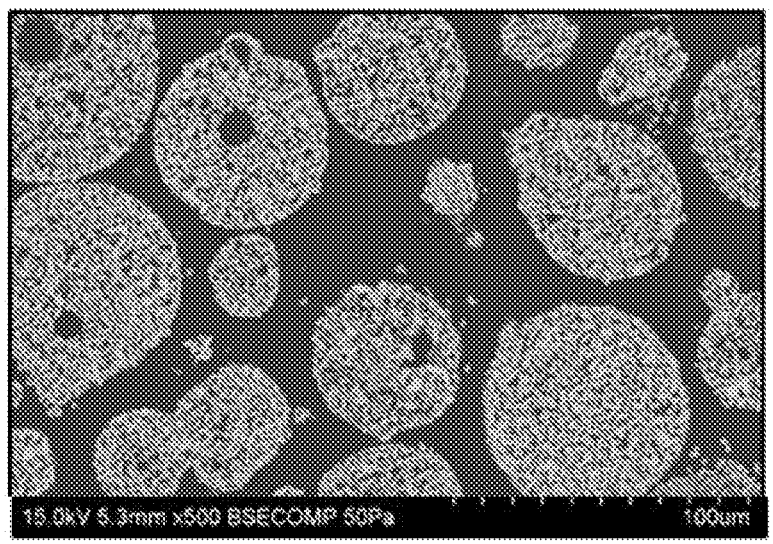
FIG. 6 shows the cross section (SEM micrograph) for the HEO agglomerated and sintered powder of Sample HEO 2.
Figure 7:
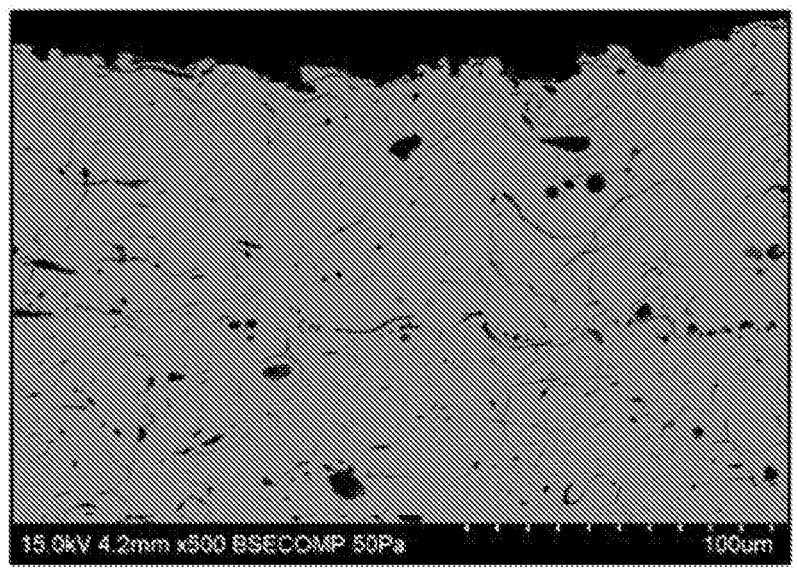
FIG. 7 shows the cross section microstructure (SEM micrograph) for the HEO thermal barrier coating, TBC top coat, of Sample HEO 2.
Figure 8:
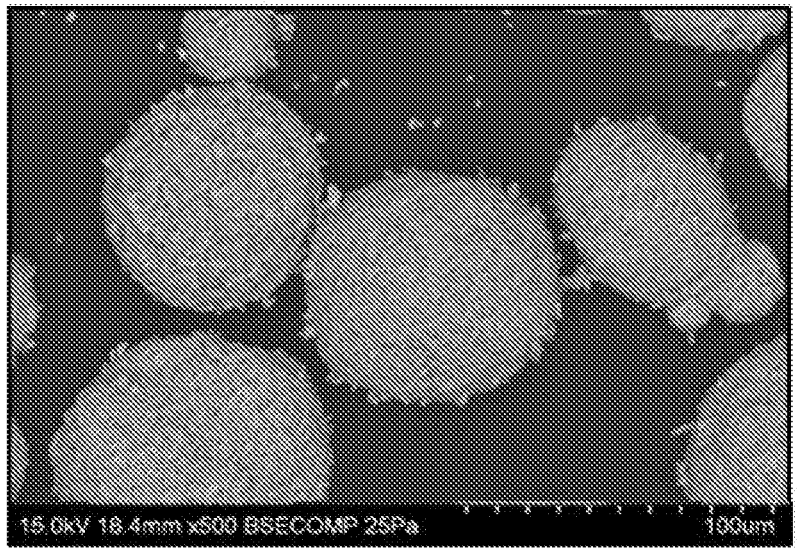
FIG. 8 shows the morphology (SEM micrograph) for the HEO agglomerated and sintered powder of Sample HEO 3.
Figure 9:
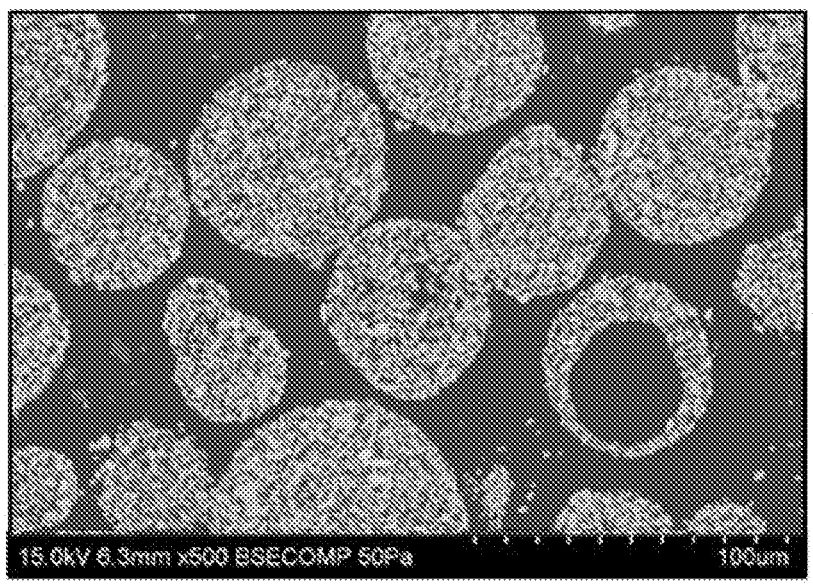
FIG. 9 shows the cross section (SEM micrograph) for the HEO agglomerated and sintered powder of Sample HEO 3.
Figure 10:
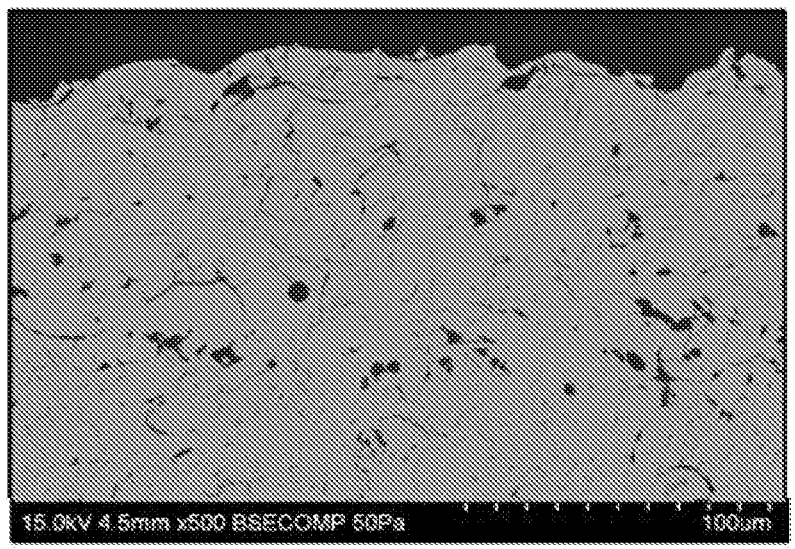
FIG. 10 shows the cross section microstructure (SEM micrograph) for the HEO agglomerated and sintered thermal barrier coating, TBC top coat, of Sample HEO 3.
Figure 11:
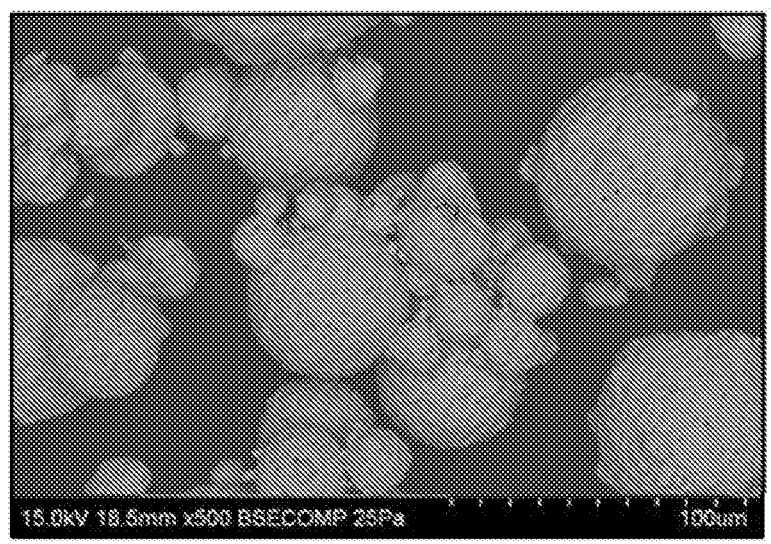
FIG. 11 shows the morphology (SEM micrograph) for the HEO agglomerated and sintered powder of Sample HEO 4.
Figure 12:
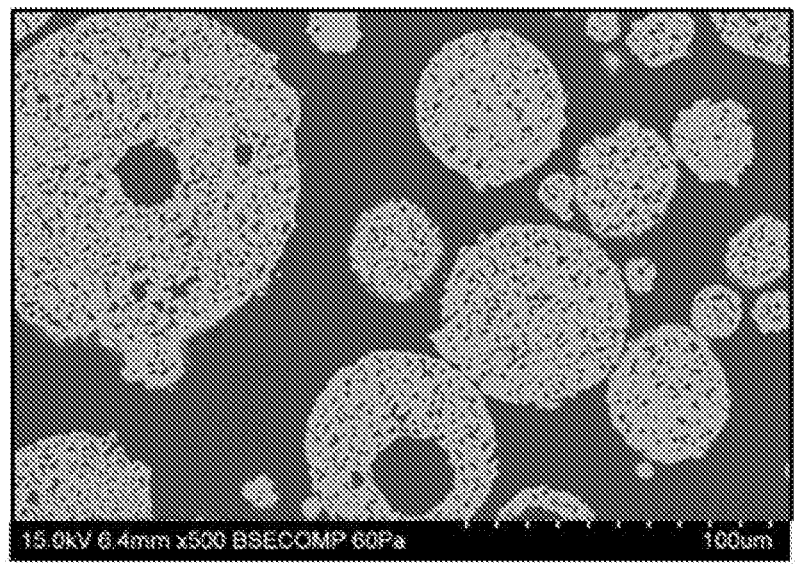
FIG. 12 shows the cross section (SEM micrograph) for the HEO agglomerated and sintered powder of Sample HEO 4.
Figure 13:
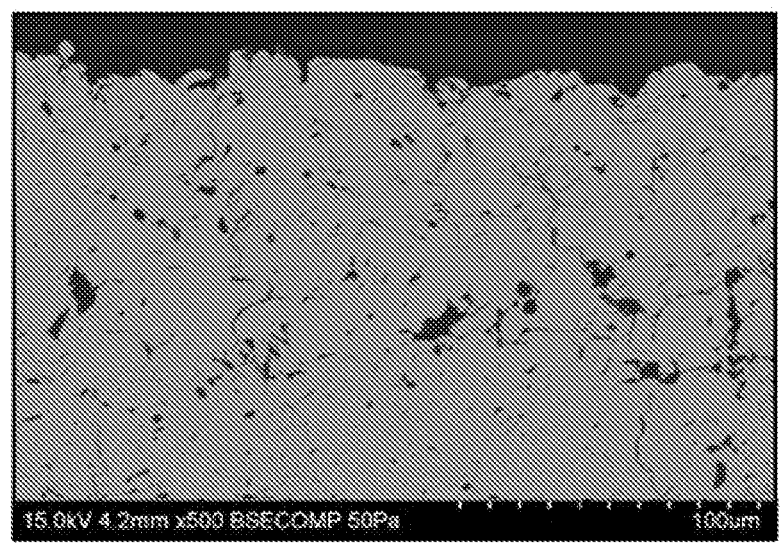
FIG. 13 shows the cross section microstructure (SEM micrograph) for the HEO agglomerated and sintered thermal barrier coating, TBC top coat, of Sample HEO 4.

The present invention provides a top coat, such as a thermal barrier coating (TBC) for a thermal barrier coating system which includes the top coat and at least one bond coat for bonding to a substrate, such as a superalloy employed in high temperature gas turbine engine components. There could also be multiple top coat layers on top of the at least one bond coat layer. The present invention also provides a thermal barrier coating material or top coat material for making the top coat or thermal barrier coating. The TBC top coats exhibit low thermal conductivity, good sintering resistance, excellent phase stability and good thermal cycling performance. The top coats are high entropy oxides which exhibit a single phase or single crystalline structure, such as tetragonal or cubic for prolonged periods over an unexpectedly wide temperature range which may be from room temperature to the operating temperature of top coats for turbine blades in jet engines. The high entropy oxide top coats of the present invention which exhibit a single phase throughout the heat cycling do not delaminate from a thermal bond coating or substrate at high operating temperatures due to substantial volume changes caused by a change in crystal structure or phase change and thermal internal stresses. Low coating weight and low coating density are achieved while providing low heat conductivity and maintaining single phase crystalline structures such as cubic or tetragonal, over prolonged times and unexpectedly wide temperature ranges up to and beyond top coat operating temperatures, which may be at least 1800° F., for example 2,000° F. or higher, preferably at least 2300° F., or up to the melting point of the TBC top coat. In embodiments of the invention, more than one phase or crystalline structure may be present in the top coat or thermal barrier coating provided it does not adversely result in substantial volume changes caused by a change in crystal structure so as to cause delamination. While only a single phase or crystalline structure is most preferred, i.e. a phase volume of 100% (as measured for example, by X-Ray Diffraction), in embodiments of the invention where two or more phases or crystalline structures are present, the primary phase volume fraction may, for example, be at least 80%, preferably at least 90%, more preferably at least 98%.

The TBC top coats using a bond coat to bond to a substrate such as a superalloy exhibit unexpectedly high thermal cyclic fatigue resistance.

The TBC top coat, and TBC material for making the top coat is a high entropy oxide (HEO) having a high configurational entropy. In aspects of the present invention, the single phase may be retained without transformation to another phase or crystalline structure from room temperature to the operating temperature of top coats for turbine components. The HEO is of the form $M_xO_y$, where M represents a group of at least 5 different oxide-forming metallic cations, x represents the number of metal cations (M) or atoms, and y represents the number of oxygen anions (O) or atoms.

In embodiments of the invention, the TBC top coat and the TBC material used to make the top coat, and the HEO is a single phase or single crystalline structure for an unexpectedly wide temperature range wherein the HEO does not undergo phase transformation to a different crystalline structure, for example, for a temperature range of at least 700° F., preferably at least 1,000° F., most preferably for at least 1,500° F. prior to or up to the top coat maximum operating temperature or the melting point of the HEO. For example, in aspects of the present invention, if the maximum operating temperature in a turbine engine component is 2,000° F., then the HEO may have a single phase or single crystalline structure from 1,300° F. to 2,000° F., preferably from 1,000° F. to 2,000° F., most preferably from 500° F. to 2,000° F., or more preferably from room temperature to 2000° F. or higher, preferably to at least 2300° F., such as to an HEO melting point of 2400° F. In aspects of the invention, the HEO may be a single phase or single crystalline structure over or throughout an 800° F. temperature range extending from 1800° F. to 2,600° F., or extending from 1,300° F. to 2,100° F. The wider the temperature range without a phase change, the better, because, for example, the number of phases changes would be fewer as the top coat cycles up to and back down from the turbine operating temperature, or as the operating temperature fluctuates, thereby helping to reduce thermal expansion and contraction and thermal stresses.

In preferred aspects of the invention, the TBC top coat, TBC coating material, and the HEO may have only a single phase or single crystalline structure which is only, for example, cubic or tetragonal from room temperature up to at least 1800° F., preferably up to at least 2,000° F., more preferably, up to at least 2300° F., for example from room temperature up to the melting point of the HEO. In embodiments of the invention, the HEOs have a melting point of at least 1,150° C. (2,102° F.), preferably at least 1,300° C. (2,372° F.), more preferably at least 1,315° C. (2,399° F.).

In embodiments of the invention the inherent thermal conductivity at 25° C. of the HEO topcoat or coating may be less than 1.5 (W/m-K) preferably less than 1.2 (W/m-K), and more preferably less than 0.9 W/m-K. In embodiments of the invention, the HEO coating may have a density lower than the theoretical density (i.e. may contain porosity) thus reducing the thermal conductivity of the HEO topcoat coating to less than 1.3 (W/m-K) preferably less than 1.0 (W/m-K) and more preferably less than 0.8 (W/m-K). This is demonstrated in Table 2.

In embodiments of the invention the TBC top coat or coating Archimedes density may be less than 7 g/cm$^3$, for example from 5 g/cm$^3$, to 6.5 g/cm$^3$, preferably less than 6.3 g/cm³, for example from 5.25 g/cm³ to 6.25 g/cm³, more preferably less than 6.0, for example 5.30 g/cm³ to 5.90 g/cm³.

In embodiments of the invention, the oxide ceramic, or HEO intended to be used as a thermally insulating material or thermal barrier coating, may have an overall combined atomic composition of which can be expressed as $M_xO_y$, where M represents a group of at least 5 different oxide-forming metallic cations and where the configurational entropy $S_{CONFIG}$ of the oxide is 1.5R per mole or greater, where R is the gas constant 8.314 J·K⁻¹·mol⁻¹; this definition using the value of $S_{CONFIG}$ being a commonly-accepted definition of a high-entropy material. The metal cations "M" and oxygen anions "O" may be distributed on one or more crystal sub-lattices. In aspects of the present invention, the TBC top coat may have a configurational entropy $S_{config}$ of the oxide which is below 1.5R per mole, for example 1.0 R per mole or greater, or 1.3R per mole or greater provided the heat conductivity is low and the metal oxide maintains phase composition for an unexpectedly wide temperature range, as discussed above, wherein the metal oxide does not undergo phase transformation and the primary phase volume fraction maintains, for example, at least 80%, preferably at least 90%, more preferably at least 98% and the melting point is above the operating temperature of the coating as described above.

$M_xO_y$ is standard metallurgical shorthand. For example, the carbide $(Cr,Mo,W,Fe)_{23}C_6$ is commonly referred to as $M_{23}C_6$. and in the same way $M_xO_y$ may be used to describe the oxide $(Zr,Ce,Y,Yb,Gd,Dy)_xO_y$, where "M" represents 5 or more oxide-forming metals.

In embodiments of the present inventions, these metals "M" may preferably be selected from the group of non-toxic and non-radioactive oxide-forming metals, such as: Transition Metals:

Sc, Y
Ti, Zr, Hf
V, Nb, Ta
Cr, Mo, W
Mn, Re
Fe, Ru, Co, Ni, Cu, Zn, and

Lanthanides:

La, Ce, Pr, Nd, Pm, Sm, Eu, Gd, Tb, Dy, Ho, Er, Yb, Lu.

In some embodiments of the invention at least one alkaline-earth metal may preferably be selected, such as Be, Mg, Ca, Sr, Ba In embodiments of the invention, the following metals are more preferred for use in HEO TBCs:
Transition Metals:

Y
Ti, Zr, Hf, V
Cr, Mo, W

Lanthanides:

La, Ce, Pm, Sm
Eu, Gd
Tb
Dy, Er, Yb

In some embodiments of the invention at least one alkaline-earth metal is more preferably selected, such as Mg, Ca In embodiments of the invention, at least one, preferably at least two of the transition metals, and/or at least one, preferably at least two of the lanthanides may be employed in the at least five of the different oxide-forming metallic cations (M).

While hafnium (Hf) has a very high melting point, in embodiments of the invention, it may be eliminated or used in low amounts, for example less than 2.0% by weight, preferably less than 1% by weight. Although higher amounts of hafnium may be employed, for example up to 15% by weight or more, high contents of hafnium are not necessarily required, thereby allowing lowering of the coating weight and density, while providing low heat conductivity and maintaining single phase crystalline structures such as cubic or tetragonal, over prolonged periods of time for unexpectedly wide temperature ranges up to and beyond top coat operating temperatures.

Still further, the metal cations "M" and oxygen anions "O" may be distributed on one or more crystal sub-lattices. This means that the oxide, such as the exemplary oxide $(Zr,Ce,Y,Yb,Gd,Dy)_xO_y$, may be physically manifested as one combined oxide structure of as-yet-unknown crystallography $(Zr,Ce,Y,Yb,Gd,Dy)_xO_y$, or it may partition itself into 2 (or more) more-commonly-known crystal lattices e.g. $(Y,Yb,Gd,Dy)_2O_3$ and $(Zr,Ce)O_2$. Accordingly, in the latter case this would imply 2 atoms from the group (Y,Yb,Gd,Dy) for every 3 oxygen atoms, and 1 atom from the group Zr,Ce for every 2 oxygen atoms, within the overall composition. With intimate mixing of these oxide lattices it may not necessarily be able to detect separate phases in the HEO structure when examined by scanning electron microscopy.

In aspects of the present invention, known high entropy oxides, such as those of the above-discussed and listed references incorporated by reference herein in their entireties, may be employed as a top coat provided they are primarily single phase, or single crystal structure such as tetragonal or cubic, provided the heat conductivity is low and the metal oxide maintains phase composition for an unexpectedly wide temperature range, as discussed above, and the melting point is above the operating temperature of the coating as described above. Most preferably, the HEO should not undergo significant transformation or alter phase fraction from room temperature to the operating temperature or melting point of the top coat, as described above.

In accordance with the present invention, in embodiments the thermal barrier coating may include a top coat, wherein the top coat is a high entropy oxide (HEO) having a high configurational entropy, the HEO being of the form $M_xO_y$, where M represents a group of at least 5 different oxide-forming metallic cations, x represents the number of metal cations (M) or atoms, and y represents the number of oxygen anions (0) or atoms, the HEO is a single phase across the operating temperature range of the top coat, and at least five of the different oxide-forming metallic cations (M) may comprise:

a) at least one of the alkaline-earth metals or Group II of the Periodic Table, Be, Mg, Ca, Sr, or Ba, and/or
b) at least one of the transition metals Sc, Y, Ti, Zr, V, Nb, Ta, Cr, Mo, W, Mn, Re, Fe, Ru, Co, Ni, Cu, or Zn, and/or
c) at least one of the lanthanides La, Ce, Pr, Nd, Pm, Sm, Eu, Gd, Tb, Dy, Ho, Er, Yb, or Lu.

In preferred embodiments of the thermal barrier coating the at least five of the different oxide-forming metallic cations (M) may comprise:

a) at least one of the transition metals Y, Ti, Zr, V, Cr, Mo, or W, and/or
b) at least one of the lanthanides La, Ce, Pm, Sm, Eu, Gd, Tb, Dy, Er, or Yb, and
c) in some embodiments at least one alkaline-earth metal: Mg, or Ca.

More preferably, the at least five of the different oxide-forming metallic cations (M) of the thermal barrier coating comprise at least five of Y, Zr, Ca, Gd, La, Yb, Ti, or Ce.

In aspects of the present invention the thermal barrier coating and the thermal barrier coating material or top coat material may comprise at least five different metal oxides which are:

a) $Y_2O_3$ in an amount of from 5% by weight to 20% by weight, preferably from 8% by weight to 18% by weight,
b) $ZrO_2$ in an amount of from 12% by weight to 55% by weight, preferably from 17% by weight to 52% by weight,
c) CaO in an amount of from 0% by weight to 15% by weight, preferably from 0% by weight to 11% by weight,
d) $Gd_2O_3$ in an amount of from 0% by weight to 30% by weight, preferably from 0% by weight to 28% by weight,
e) $La_2O_3$ in an amount of from 0% by weight to 26% by weight, preferably from 0% by weight to 24% by weight,
f) $Yb_2O_3$ in an amount of from 0% by weight to 32% by weight, preferably from 0% by weight to 30% by weight,
g) $TiO_2$ in an amount of from 0% by weight to 10% by weight, preferably from 0% by weight to 7% by weight, or
h) $CeO_2$ in an amount of from 0% by weight to 18% by weight, preferably from 0% by weight to 15% by weight, the percentages of a) to h) adding up to 100% by weight. In embodiments, the thermal barrier coating and the thermal barrier coating material or top coat material may further include at least one additional metal oxide, such as $HfO_2$, $SiO_2$, MgO, or $Al_2O_3$, as melting point adjusters, stabilizers, dopants, or impurities, in an amount up to 3% by weight, for example, up to 2% by weight or less than or equal to 1% by weight, the weight percentages of all of the oxides adding up to 100% by weight. In embodiments of the invention, the percentages of the five metal oxides may add up to at least 97% by weight, for example at least 99% by weight, and the additional metal oxide or oxides may be present in an amount of up to 3% by weight, or up to 1% by weight.

In more preferred embodiments, the thermal barrier coating and the thermal barrier coating material or top coat material may comprise at least five different metal oxides which include: $Y_2O_3$ in an amount of from 8% by weight to 12% by weight, $ZrO_2$ in an amount of from 48% by weight to 55% by weight, $Yb_2O_3$ in an amount of from 14% by weight to 18% by weight, $TiO_2$ in an amount of from 4% by weight to 8% by weight, and $CeO_2$ in an amount of from 12% by weight to 17% by weight, said percentages adding up to 100% by weight. Hafnium, and additional other metal oxides may optionally be included in an amount up to 2% by weight, for example, less than or equal to 1% by weight, the weight percentages of all of the oxides adding up to 100% by weight.

In other preferred embodiments, the thermal barrier coating and the thermal barrier coating material or top coat material may comprise at least five different metal oxides which include:
three metal oxides which are
$Y_2O_3$ in an amount of from 13% by weight to 19% by weight,
$ZrO_2$ in an amount of from 14% by weight to 25% by weight, and
$Gd_2O_3$ in an amount of from 20% by weight to 30% by weight, and any two of the metal oxides which are
$Yb_2O_3$ in an amount of from 23% by weight to 32% by weight,
$La_2O_3$ in an amount of from 18% by weight to 25% by weight, or
CaO in an amount of from 6% by weight to 12% by weight, the percentages of the five metal oxides adding up to at least 97% by weight and preferably between 98% and 100% by weight.

In embodiments of the invention, the TBC top coat material or HEO may be manufactured in powder form or bulk form, such as wire, bar, rod or ingot form. The TBC top coat material powder may be a homogeneous mixture of separate powders of each of the components of the TBC top coat material. The TBC top coat material powder may also be composed of particles, each of which contain all or some of the components of the bond coating material. For example, a bulk form of all the components of the TBC top coat material or HEO may be ground to obtain a powder. The particle size of the TBC top coat material may depend upon the coating method employed. Conventional particle size distributions conventionally employed with a given coating method may be used with the TBC top coat materials or HEOs of the present invention.

The bond coating material may be any conventional or known bond coat material such as those used for the coating of gas turbine engine parts, such as known MCrAlY bonding layers for bonding a TBC top coat to a substrate, such as a superalloy. By way of example, M may represent Ni, Co, Fe or their combinations. To increase the performance of a bond coat, Hf, Re and Pt and various other rare earth elements may often be added in advanced bond coats. Non-limiting examples of the bond coat material which may be employed include those disclosed in U.S. Pat. No. 4,117,179 to Jackson et al, U.S. Pat. No. 5,141,821 to Lugscheider, and U.S. Pat. No. 4,275,124 to McComas et al, the disclosures of which are each herein incorporated by reference in their entireties.

The substrate may be any known or conventional material or article in need of a top coat or barrier coating (TBC). Non-limiting examples of the substrate include alloys, or superalloys used in the manufacture of gas turbine engine parts, such as Hastelloy® X, as disclosed in U.S. Pat. No. 4,124,737 to Wolfa et al, the disclosure of which is herein incorporated by reference in its entirety. Hastelloy®X, as disclosed by Wolfa et al, has a nominal composition of 22.0 wt. % chromium; 9.0 wt. % molybdenum, 18.5 wt. % iron; 1.5 wt. % cobalt; 0.6 wt. % tungsten, 1.0 wt % silicon, 1.0 wt. % manganese, 0.1 wt. % carbon, and the balance nickel. Other non-limiting examples of known and conventional substrates which may be coated with the TBC top coat of the present invention include steel, stainless steel, other iron-base alloys with low alloying content, chromium and chromium base alloys, and the refractory metal and refractory metal base alloys. Non-limiting examples of superalloy substrates which may be coated with the TBC top coat of the present invention are known carbide reinforced superalloys, such as nickel-base and cobalt-base superalloys, directionally solidified nickel-base and cobalt-base superalloys including eutectic alloys, as well as refractory alloys, etc. as disclosed in U.S. Pat. No. 4,117,179, the disclosure of which is hereby incorporated by reference in its entirety. Non-limiting examples of substrates or articles which may be coated with the TBC top coat of the present invention include components used in the hot sections of gas turbines and various jet engine components.

In another aspect of the invention, as schematically illustrated in FIG. 1, a thermal barrier coating (TBC) system 1 includes a top coat 2 and the bond coat or bond coating 3, with the top coat 2, such as a TBC, being bonded to the bond coat or bond coating 3 at the top coat/bond coat interface 5. A coated substrate 10 comprises a substrate 15 and the thermal barrier coating system 1 bonded to the substrate 15 by the bond coat or coating 3 at the substrate/bond coat interface 20. The thermal barrier coating system 1 may be produced from the thermal spray powder. The thermal barrier coating system 1 is bonded to a substrate 15, such as a superalloy or gas engine turbine component, by the bond coat or bond coating 3, which is between the top coat 2 and the substrate 15.

In embodiments of the invention, multiple bond coats or bond coatings 3 and multiple top coats 2 may be employed, with each top coat 2 being on top of a bond coat 3 in alternating fashion, to provide a plurality of TBC systems 1, stacked and bonded one on another, with the bottommost bond coat 3 bonded to the substrate 15.

In an additional aspect of the invention, a method is provided for reducing delamination of a top coat from a substrate by bonding the TBC top coat having a single phase or single crystalline structure, such as a tetragonal or cubic crystalline structure to the substrate with a bond coat or coating.

The TBC top coat, or HEO, and the bond coat or bond coating or bonding layer, may be deposited, applied, or laminated on the substrate using conventional thermal spray processes, such as air plasma spray, suspension plasma, high velocity oxy-fuel spray (HVOF), low pressure plasma spray (LPPS), vacuum plasma spray (VPS), chemical vapor deposition (CVD), plasma physical vapor deposition (PS-PVD), physical vapor deposition (PVD) which includes vacuum deposition methods, such as sputtering and evaporation, and conventional flame spray processes, such as combustion wire spray, and combustion powder spray, electric arc wire spray, powder flame spray, and electron beam physical vapor deposition (EBPVD). Conventional and known coating layer thicknesses may be employed for the bond coat or coating, and the top coat or TBC or HEO.

In embodiments of the invention, a thermal barrier coating material or the HEO material may be manufactured by agglomerating and sintering a thermal barrier coating material to obtain a sintered agglomerate, and forming the sintered agglomerate into a powder for thermal spraying using known techniques and processes. Agglomerating and sintering is a specifically novel way to manufacture HEOs. The process is advantageous because it: 1) reduces the diffusion pathways, and 2) is more amenable to industrial production. The reduction of the diffusion pathways is very advantageous as homogenizing high temperature materials into a single phase can be expensive and time consuming when compared with other processes. In embodiments of the invention, a thermal barrier coating may be manufactured by agglomerating and sintering a thermal barrier coating material to obtain a sintered agglomerate, and forming the sintered agglomerate into a powder for thermal spraying using known process parameters and techniques.

The present invention is further illustrated by the following non-limiting examples where all parts, percentages, proportions, and ratios are by weight, all temperatures are in ° C., and all pressures are atmospheric unless otherwise indicated.

EXAMPLES

The compositions of four HEO TBC top coat materials (as powders), of the present invention used to make HEO TBC top coats of the present invention for a coated substrate are shown in Table 1.

The Table 1 compositions of the samples tested, and the results of the testing are:

TABLE 1

Compositions of the HEO TBC Top Coat Materials Used
To Make HEO TBC Top Coats For A Coated Substrate

| Sample | $ZrO_2$ wt % | $Y_2O_3$ wt % | $Gd_2O_3$ wt % | $Yb_2O_3$ wt % | $La_2O_3$ wt % | CaO wt % | $CeO_2$ wt % | $TiO_2$ wt % | Traces wt % |
|---|---|---|---|---|---|---|---|---|---|
| HEO 1 | 23.4 | 16.0 | 26.0 |  | 23.5 | 10.5 |  |  | 0.6 |
| HEO 2 | 18.3 | 17.0 | 27.1 | 29.4 |  | 7.9 |  |  | 0.3 |
| HEO 3 | 16.4 | 14.9 | 23.3 | 25.3 | 20.0 |  |  |  | 0.1 |
| HEO 4 | 51.9 | 9.9 |  | 17.1 |  |  | 14.6 | 6.0 | 0.5 |

For the TBC top coat materials (HEOs): the coating density, relative density, coating phase, and thermal conductivity measured at 25° C., are shown in Table 2.

The Table 2 results of the properties for the samples tested are:

TABLE 2

Properties of the HEO TBC Top Coats

| Property | Units Measurement | HEO 1 | HEO 2 | HEO 3 | HEO 4 |
|---|---|---|---|---|---|
| Archimedes Density | g/cm$^3$ | 5.36 | 5.72 | 6.23 | 5.87 |
| Relative Density | % | 91.8 | 92.3 | 92.7 | 93.1 |
| Primary Phase Fraction from XRD (Vol %) | Vol % | 65% | 87% | >98% | >99% |
| Thermal conductivity at 25° C. | W/m – K | 1.22 | 1.30 | 1.21 | 0.77 |

Figure 14:
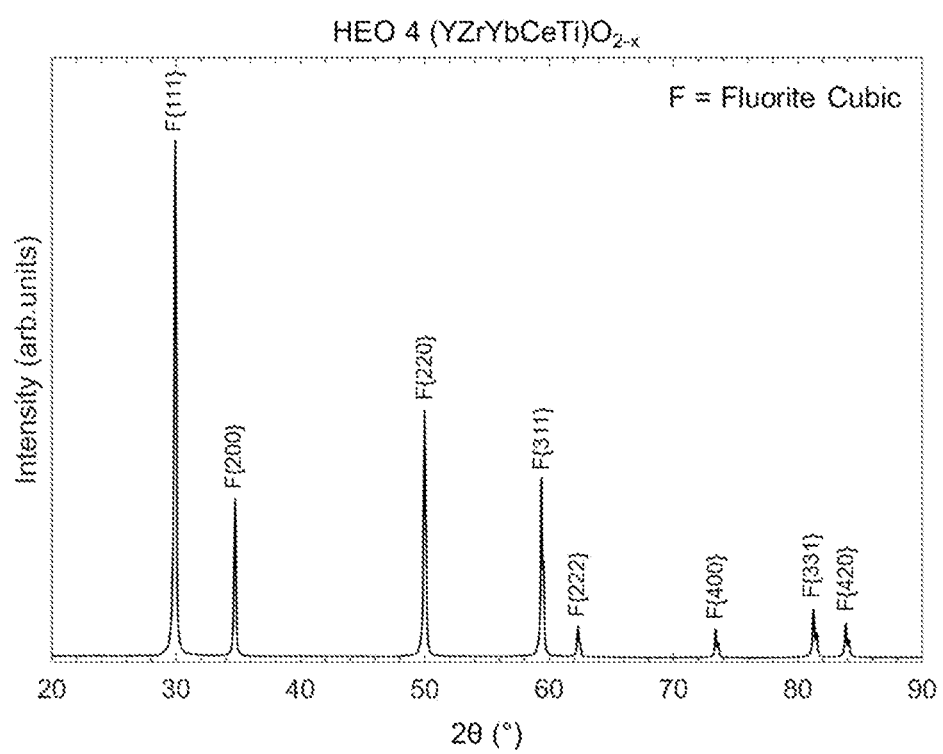
FIG. 14 shows the experimental XRD pattern for Sample HEO 4.

The powder morphology (SEM micrograph), powder cross section (SEM micrograph), and coating microstructure (SEM micrograph) for the HEO agglomerated and sintered thermal barrier coatings of samples HEO 1, HEO 2, HEO 3 and HEO 4 are shown in FIGS. 2-13. An example of the X-Ray diffraction pattern of one of the HEO compounds, HEO 4, is shown in FIG. 14.

Further, at least because the invention is disclosed herein in a manner that enables one to make and use it, by virtue of the disclosure of particular exemplary embodiments, such as for simplicity or efficiency, for example, the invention can be practiced in the absence of any step, additional element or additional structure that is not specifically disclosed herein.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A thermal barrier coating material comprising:
   a high entropy oxide (HEO) having a high configurational entropy, the HEO having a formula of $M_xO_y$, where M represents a group of at least five different oxide-forming metallic cations, x represents the number of metal cations (M) or atoms, and y represents the number of oxygen anions (O) or atoms,
   wherein the HEO is a single phase across an operating temperature range from room temperature to 2,000° F., and
   the at least five different oxide-forming metallic cations (M) comprise:
   a) at least one of the transition metals Sc, Y, Ti, Zr, V, Nb, Ta, Cr, Mo, W, Mn, Re, Fe, Ru, Co, Ni, Cu, or Zn, and/or
   b) at least one of the lanthanides La, Ce, Pr, Nd, Pm, Sm, Eu, Gd, Tb, Dy, Ho, Er, Yb, or Lu, and,
   further comprising at least five different metal oxides, which comprise the at least five different oxide-forming metallic cations (M), and which are selected from the group:
   a) $Y_2O_3$ in an amount of from 5% by weight to 20% by weight,
   b) $ZrO_2$ in an amount of from 12% by weight to 55% by weight,
   c) CaO in an amount of greater than 0% by weight up to 15% by weight,
   d) $Gd_2O_3$ in an amount of greater than 0% by weight up to 30% by weight,
   e) $La_2O_3$ in an amount of greater than 0% by weight up to 26% by weight,
   f) $Yb_2O_3$ in an amount of greater than 0% by weight up to 32% by weight,
   g) $TiO_2$ in an amount of greater than 0% by weight up to 10% by weight, and
   h) $CeO_2$ in an amount of greater than 0% by weight up to 18% by weight,
   wherein amount percentages of the at least five of the metal oxides add up to at least 97% by weight.

2. The thermal barrier coating material of claim 1, wherein the at least five different oxide-forming metallic cations (M) comprise at least one of the alkaline-earth metals Be, Mg, Ca, Sr, or Ba.

3. The thermal barrier coating material of claim 1, wherein the at least five of the different oxide-forming metallic cations (M) comprise at least five different oxide-forming metallic cations selected from the group consisting of Y, Zr, Ca, Gd, La, Yb, Ti, and Ce.

4. The thermal barrier coating material of claim 1, which is at least one of a powder, a wire, a bar, an ingot and a rod.

5. The thermal barrier coating material of claim 1 is agglomerated and sintered.

6. The thermal barrier coating material of claim 5 which is in powdered form.

7. The thermal barrier coating material according to claim 1, wherein the group which comprises the at least five different metal oxides further comprises:
   i) MgO in an amount greater than 0% by weight.

8. The thermal barrier coating material according to claim 1, wherein the at least five of the different oxide-forming metallic cations (M) further comprises:
   a) at least two of the transition metals Sc, Y, Ti, Zr, V, Nb, Ta, Cr, Mo, W, Mn, Re, Fe, Ru, Co, Ni, Cu, or Zn, and
   b) at least two of the lanthanides La, Ce, Pr, Nd, Pm, Sm, Eu, Gd, Tb, Dy, Ho, Er, Yb, or Lu.

9. The thermal barrier coating material according to claim 8, wherein the at least five of the different oxide-forming metallic cations (M) further comprises:
   c) the at least at least one of the alkaline-earth metals of Be, Mg, Ca, Sr, or Ba.

10. A thermal barrier coating comprising:
    a top coat, wherein the top coat comprises the thermal barrier coating material of claim 1,
    wherein the HEO maintains phase composition without transformation from room temperature to the operating temperature range of the top coat.

11. The thermal barrier coating of claim 10, wherein the at least five of the different oxide-forming metallic cations (M) comprise at least one of:
    a) at least one transition metal of Y, Ti, Zr, V, Cr, Mo, or W, or
    b) at least one lanthanide of La, Ce, Pm, Sm, Eu, Gd, Tb, Dy, Er, or Yb.

12. The thermal barrier coating of claim 11, wherein one of the at least five different oxide-forming metallic cations (M) comprise at least one alkaline-earth metal of Mg or Ca.

13. The thermal barrier coating of claim 10, further comprising metal oxides including the at least five different oxide-forming metallic cations (M), the metal oxides comprising at least five different metal oxides from the group:
    a) $Y_2O_3$ in an amount of from 8% by weight to 18% by weight,
    b) $ZrO_2$ in an amount of from 17% by weight to 52% by weight,
    c) CaO in an amount of greater than 0% by weight up to 11% by weight,
    d) $Gd_2O_3$ in an amount of greater than 0% by weight up to 28% by weight,
    e) $La_2O_3$ in an amount of greater than 0% by weight up to 24% by weight,
    f) $Yb_2O_3$ in an amount of greater than 0% by weight up to 30% by weight, g) TiO$_2$ in an amount of greater than 0% by weight up to 7% by weight, and
h) CeO$_2$ in an amount of greater than 0% by weight up to 15% by weight.

14. The thermal barrier coating of claim 10, further comprising metal oxides including the at least five different oxide-forming metallic cations (M), the metal oxides comprising:
Y$_2$O$_3$ in an amount of from 8% by weight to 12% by weight,
ZrO$_2$ in an amount of from 48% by weight to 55% by weight,
Yb$_2$O$_3$ in an amount of from 14% by weight to 18% by weight,
TiO$_2$ in an amount of from 4% by weight to 8% by weight, and
CeO$_2$ in an amount of from 12% by weight to 17% by weight,
said percentages adding up to at least 97% by weight.

15. The thermal barrier coating of claim 14, further comprising at least one additional metal oxide in an amount greater than 0% by weight up to 2% by weight, said weight percentages adding up to at least 99% by weight.

16. The thermal barrier coating of claim 14, further comprising HfO$_2$ in an amount greater than 0% by weight up to 2% by weight, said weight percentages adding up to at least 99% by weight.

17. The thermal barrier coating of claim 10, wherein at least five different oxides comprising the at least five different oxide-forming metallic cations (M) comprise:
three metal oxides which are
Y$_2$O$_3$ in an amount of from 13% by weight to 19% by weight,
ZrO$_2$ in an amount of from 14% by weight to 25% by weight,
Gd$_2$O$_3$ in an amount of from 20% by weight to 30% by weight, and
two different metal oxides selected from the group consisting of
Yb$_2$O$_3$ in an amount of from 23% by weight to 32% by weight,
La$_2$O$_3$ in an amount of from 18% by weight to 25% by weight, or and
CaO in an amount of from 6% by weight to 12% by weight,
the percentages of the five metal oxides adding up to at least 97% by weight.

18. The thermal barrier coating of claim 10, wherein the configurational entropy of the oxide is at least 1.5R per mole, where R is the gas constant J·K$^{-}$·mol$^{-1}$.

19. The thermal barrier coating of claim 10, wherein the at least five different oxide-forming metallic cations are present in compositions between 5 and 35 atomic %.

20. The thermal barrier coating of claim 10, wherein M represents at least one member of Group II of the Periodic Table.

21. The thermal barrier coating of claim 10, wherein the at least five different oxide-forming metallic cations comprise at least one from the group consisting of at least two lanthanides and at least two transition metals.

22. The thermal barrier coating of claim 10, further comprising a thermal barrier coating bond coat.

23. The thermal barrier coating of claim 10, wherein the HEO is a single phase or single crystalline structure from room temperature up to at least 2,000° F.

24. The thermal barrier coating of claim 10, wherein the HEO is a single phase or single crystalline structure which is cubic from room temperature up to at least 2,000° F.

25. The thermal barrier coating of claim 10, wherein the HEO is a single phase or single crystalline structure from 1800° F. to 2600° F.

26. The thermal barrier coating of claim 10, wherein the HEO is a single phase or single crystalline structure which is tetragonal from room temperature up to at least 2000° F.

27. The thermal barrier coating of claim 10, wherein the HEO is a single phase or single crystalline structure from room temperature up to the melting point of the HEO.

28. The thermal barrier coating of claim 10, wherein the HEO does not undergo phase transformation to a different crystalline structure for at least 700° F. up to the melting point of the HEO.

29. A method for making a thermal barrier coating comprising:
agglomerating and sintering a thermal barrier coating material of claim 1 to obtain a sintered agglomerate, and
forming the sintered agglomerate into a powder for thermal spraying.

30. A coated substrate comprising a substrate and a thermal barrier coating of claim 22, wherein the top coat of the thermal barrier coating is bonded by the thermal barrier coating bond coat to the substrate.

31. A method for reducing delamination of a top coat from a substrate comprising:
bonding a thermal barrier coating of claim 22 to a substrate,
wherein the top coat of the thermal barrier coating is bonded by the thermal barrier coating bond coat to the substrate.

32. A thermal barrier coating material comprising:
a high entropy oxide (HEO) having a high configurational entropy, the HEO having a formula of M$_x$O$_y$, where M represents a group of at least five different oxide-forming metallic cations, x represents the number of metal cations (M) or atoms, and y represents the number of oxygen anions (0) or atoms, wherein the HEO is a single phase across an operating temperature range from room temperature to 2,000° F., and the at least five different oxide-forming metallic cations (M) comprise:
a) at least one of the transition metals Sc, Y, Ti, Zr, V, Nb, Ta, Cr, Mo, W, Mn, Re, Fe, Ru, Co, Ni, Cu, or Zn, and/or
b) at least one of the lanthanides La, Ce, Pr, Nd, Pm, Sm, Eu, Gd, Tb, Dy, Ho, Er, Yb, or Lu, and
further comprising at least five different metal oxides which comprise the at least five different oxide-forming metallic cations (M),
and which are selected from the group:
Y$_2$O$_3$ in an amount of from 8% by weight to 12% by weight,
ZrO$_2$ in an amount of from 48% by weight to 55% by weight,
Yb$_2$O$_3$ in an amount of from 14% by weight to 18% by weight,
TiO$_2$ in an amount of from 4% by weight to 8% by weight, and
CeO$_2$ in an amount of from 12% by weight to 17% by weight,
said percentages adding up to at least 97% by weight.

33. A thermal barrier coating material comprising:
a high entropy oxide (HEO) having a high configurational entropy, the HEO having a formula of $M_xO_y$, where M represents a group of at least five different oxide-forming metallic cations, x represents the number of metal cations (M) or atoms, and y represents the number of oxygen anions (O) or atoms,
wherein the HEO maintains a phase composition without transformation from room temperature to an operating temperature range of the top coat up to at least 2000° F., and
the at least five of the different oxide-forming metallic cations (M) at least comprise Y, Zr, Ca, La, Yb, Ti, or Ce, and
the HEO comprises at least five different metal oxides selected from the group consisting of:
a) $Y_2O_3$ in an amount of from 5% by weight to 20% by weight,
b) $ZrO_2$ in an amount of from 12% by weight to 55% by weight,
c) CaO in an amount of greater than 0% by weight up to 15% by weight,
d) $La_2O_3$ in an amount of greater than 0% by weight up to 26% by weight,
e) $Yb_2O_3$ in an amount of greater than 0% by weight up to 32% by weight,
f) $TiO_2$ in an amount of greater than 0% by weight up to 10% by weight, and
g) $CeO_2$ in an amount of greater than 0% by weight up to 18% by weight.

34. A thermal barrier coating material comprising:
a high entropy oxide (HEO) having a high configurational entropy, the HEO having a formula of $M_xO_y$, where M represents a group of at least five different oxide-forming metallic cations, x represents the number of metal cations (M) or atoms, and y represents the number of oxygen anions (O) or atoms,
wherein the HEO maintains a phase composition without transformation from room temperature to an operating temperature range of the top coat up to at least 2000° F., and
the at least five of the different oxide-forming metallic cations (M) at least comprise Y, Zr, Ca, La, Yb, Ti, Ce, or Gd and
the HEO comprises at least five different metal oxides selected from the group of:
a) $Y_2O_3$ in an amount of from 5% by weight to 20% by weight,
b) $ZrO_2$ in an amount of from 12% by weight to 55% by weight,
c) CaO in an amount of greater than 0% by weight up to 15% by weight,
d) $La_2O_3$ in an amount of greater than 0% by weight up to 26% by weight,
e) $Yb_2O_3$ in an amount of greater than 0% by weight up to 32% by weight,
f) $TiO_2$ in an amount of greater than 0% by weight up to 10% by weight,
g) $CeO_2$ in an amount of greater than 0% by weight up to 18% by weight, and
h) $Gd_2O_3$ in an amount greater than 0% by weight,
wherein the percentages of the at least five of the metal oxides add up to at least 97% by weight.

35. The thermal barrier coating material according to claim 34, wherein the at least five different oxide-forming metallic cations (M) further comprise Mg and
wherein the group from which the at least five different metal oxides is selected further includes:
i) MgO in an amount greater than 0% by weight.

* * * * *